United States Patent
Bascom et al.

(10) Patent No.: US 7,247,585 B2
(45) Date of Patent: *Jul. 24, 2007

(54) REINFORCED NONWOVEN FIRE BLOCKING FABRIC HAVING RIDGES AND GROOVES AND ARTICLES FIRE BLOCKED THEREWITH

(75) Inventors: Laurence N. Bascom, Amelia, VA (US); Herman Hans Forsten, Williamsburg, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/996,897

(22) Filed: Nov. 23, 2004

(65) Prior Publication Data

US 2006/0111000 A1    May 25, 2006

(51) Int. Cl.
*B32B 27/12* (2006.01)
*B32B 27/04* (2006.01)

(52) U.S. Cl. ............... 442/2; 442/35; 442/36; 442/43; 442/46; 442/49; 442/50; 442/57; 442/58; 442/136; 442/164; 442/169; 442/352; 428/920; 428/921

(58) Field of Classification Search ............ 442/2, 442/35, 36, 43, 46, 49, 50, 57, 58, 136, 164, 442/169, 352; 428/920, 921
See application file for complete search history.

(56) References Cited

U.S. PATENT DOCUMENTS

| | | | |
|---|---|---|---|
| 3,118,750 A | 1/1964 | Dunlap et al. | |
| 3,193,602 A | 7/1965 | Leonard et al. | |
| 3,546,056 A | 12/1970 | Thomas | |
| 3,565,749 A | 2/1971 | Wizon | |
| 3,597,299 A | 8/1971 | Thomas et al. | |
| 3,748,302 A | 7/1973 | Jones | |
| 3,767,756 A | 10/1973 | Blades | |
| 3,819,465 A | 6/1974 | Parsons et al. | |
| 3,869,429 A | 3/1975 | Blades | |
| 3,869,430 A | 3/1975 | Blades | |
| 4,743,495 A | 5/1988 | Lilani et al. | |
| 4,748,065 A * | 5/1988 | Tanikella | 428/152 |
| 4,840,838 A | 6/1989 | Wyss | |
| 5,153,056 A | 10/1992 | Groshens | |
| 5,208,105 A | 5/1993 | Ichibori et al. | |
| 5,316,834 A * | 5/1994 | Matsuda et al. | 442/247 |
| 5,417,752 A | 5/1995 | Paren et al. | |
| 5,470,648 A | 11/1995 | Pearlman et al. | |
| 5,506,042 A | 4/1996 | Ichibori et al. | |
| 5,691,036 A | 11/1997 | Lin et al. | |
| 6,383,623 B1 | 5/2002 | Erb, Jr. | |
| 6,579,396 B2 | 6/2003 | Erb, Jr. | |
| 6,596,658 B1 | 7/2003 | Putnam et al. | |
| 6,790,795 B2 | 9/2004 | Erb et al. | |
| 6,955,193 B2 * | 10/2005 | Hainsworth et al. | 139/426 R |
| 2002/0098753 A1 | 7/2002 | Latharn et al. | |
| 2002/0182967 A1* | 12/2002 | Erb et al. | 442/415 |
| 2002/0182976 A1 | 12/2002 | Erb, Jr. et al. | |
| 2003/0213546 A1 | 11/2003 | Hartgrove | |
| 2003/0232560 A1* | 12/2003 | Corner | 442/401 |
| 2004/0028958 A1* | 2/2004 | Assink et al. | 428/920 |
| 2004/0060119 A1 | 4/2004 | Murphy et al. | |
| 2004/0198125 A1* | 10/2004 | Mater et al. | 442/394 |
| 2005/0215142 A1 | 9/2005 | Bascom et al. | |

FOREIGN PATENT DOCUMENTS

| | | |
|---|---|---|
| EP | 0 622 332 A | 11/1994 |
| EP | 622 332 B1 | 8/1998 |
| EP | 1 126 066 A1 | 8/2001 |
| FR | 2 761 381 A | 10/1998 |
| GB | 1064271 | 4/1967 |
| WO | WO 92/17629 | 10/1992 |
| WO | WO 98/42905 | 1/1998 |
| WO | WO 03/023108 A1 | 3/2003 |
| WO | WO 03/049581 A2 | 6/2003 |

* cited by examiner

*Primary Examiner*—Ula C. Ruddock

(57) ABSTRACT

This invention relates to a thin reinforced nonwoven fabric having ridges and grooves for fire blocking an article and articles containing such fabrics. When exposed to heat or flame, the fabric is capable of increasing to a thickness that is at least 1.5 times its original thickness. The fabric comprises an open mesh scrim having a having crimped, heat-resistant organic fibers compressed thereon and held in a compressed state by a thermoplastic binder, on which is imparted a ridge and groove structure. When subjected to high heat or flame, the binder in the structure softens, releasing the restrained crimped fibers and any ridges and grooves and allowing the thickness of the fabric to increase.

20 Claims, 2 Drawing Sheets

REINFORCED NONWOVEN FIRE BLOCKING FABRIC HAVING RIDGES AND GROOVES AND ARTICLES FIRE BLOCKED THEREWITH

BACKGROUND OF THE INVENTION

1. Field of the Invention

This invention relates to a thin reinforced nonwoven fabric having ridges and grooves made from a compressed web of crimped fiber and a reinforcing scrim. The fabric bulks when exposed to heat or flame and is useful as a component for fire blocking mattresses, upholstery, and the like, especially those that are substantially made from foam. This invention further relates to a fire-blocked article incorporating this fabric.

2. Description of Related Art

The State of California has led the drive to regulate and reduce the flammability of mattresses and mattress sets in an attempt to reduce the number of lives lost in household, hotel, and institutional fires. In particular, the Bureau of Home Furnishings and Thermal Insulation of the Department of Consumer Affairs of the State of California issued Technical Bulletin 603 "Requirements and Test Procedure for Resistance of a Residential Mattress/Box Spring Set to a Large Open-Flame" to quantify the flammability performance of mattress sets. In many cases, mattress makers want to include a layer of fire blocking, however, they do not want that additional layer to detract from the existing aesthetics of their mattresses.

Strong thin fabrics, such as a combination of staple fibers and a thin reinforcing scrim fabric, could be desired in many instances because they are durable and also are not likely to be objectionable. Various methods are known in the art for combining staple fibers and scrim fabrics that lock the staple fibers in place. One such process is hydro-entangling, also known in various publications as hydrolacing, spunlacing, and water-jet treatments, where high pressure water jets impact the staple fibers and drive them into the scrim, consolidating the fiber and scrim together. Another process known in the art for combining staple fibers and scrim fabrics is by needlepunching. In this process, barbed needles grab the staple fibers and drive them into the scrim, or into the internal fiber batting, locking together the structure. Nonwoven sheets made by these processes mechanically and strongly entangle the staple fibers either with themselves or with the scrim or both, limiting the ability of the fabric to bulk when heated or exposed to flame.

Still another process known in the art for combining staple fibers and scrim fabric is by adhesive lamination or the addition of binders. In this process, a binder or adhesive is used to either adhere or bind layers or individual fibers together. For example, U.S. Pat. Nos. 6,579,396 and 6,383,623 to Erb disclose a very low-density insulating material having non-thermoplastic fibers that are bound by a flammable thermoplastic binder. European Patent EP 622 332 to Yamaguchi et al. discloses a heat resistant and flame-retardant cushioning structure comprising a matrix fiber of a bulky nonwoven web of crimped non-elastic staple fiber, a crimped flame-retardant fiber exhibiting residual weight of at least 35% as tested by a glowing test method, and a thermoplastic elastic fiber; with at least some of the intersecting points between the matrix fiber and the flame-retardant fiber with thermoplastic fiber being fusion bonded. The Erb and Yamaguchi patents both use the binder to maintain the loft or thickness of these thick fabrics; that is, the nonwoven remains in a lofted or bulked form so that it will have resiliency.

The process of incorporating a fabric into a mattress can be made more difficult if the mattress is a foam mattress. Typically the fabric to cover the mattress is sewn into a sleeve or pocket-type structure; the foam mattress is then mechanically compressed and the sleeve structure slid over mattress. The mechanical compression is released and the foam mattress then fills the covering sleeve. This process requires that the sleeve material have enough elongation or give so that it does not tear while being installed on such a mattress or when the foam mattress fully extends to its original shape.

U.S. Patent Application Publication US 2003/0213546 of Hartgrove discloses a durable, extensible nonwoven fabric that is suitable for mattress pad covers wherein the skirt of the mattress pad cover must exhibit extensibility so as to expand over the thickness of the mattress on which the cover is fitted. This fabric, like the hydroentangled nonwoven it is made from, has very limited ability to bulk when heated or exposed to flame due to the mechanical entanglement of the fibers.

What is needed therefore, is a reinforced nonwoven fabric that can elongate to facilitate installation on a foam mattress without tearing and is lightweight and thin during normal use but then bulks when subjected to high heat or flame.

SUMMARY OF THE INVENTION

This invention relates to a reinforced nonwoven fabric for fire blocking an article, and an article fire blocked with the nonwoven fabric, wherein the fabric comprises an open mesh scrim having a first side and a second side, the first and second sides having crimped, heat-resistant organic fibers compressed thereon, the fibers held in a compressed state by a thermoplastic binder, the fabric further having ridges and grooves, wherein when the fabric is exposed to heat or flame, the fabric is capable of increasing to a thickness that is at least 1.5 times its original thickness.

DETAILS OF THE INVENTION

Figure 1:
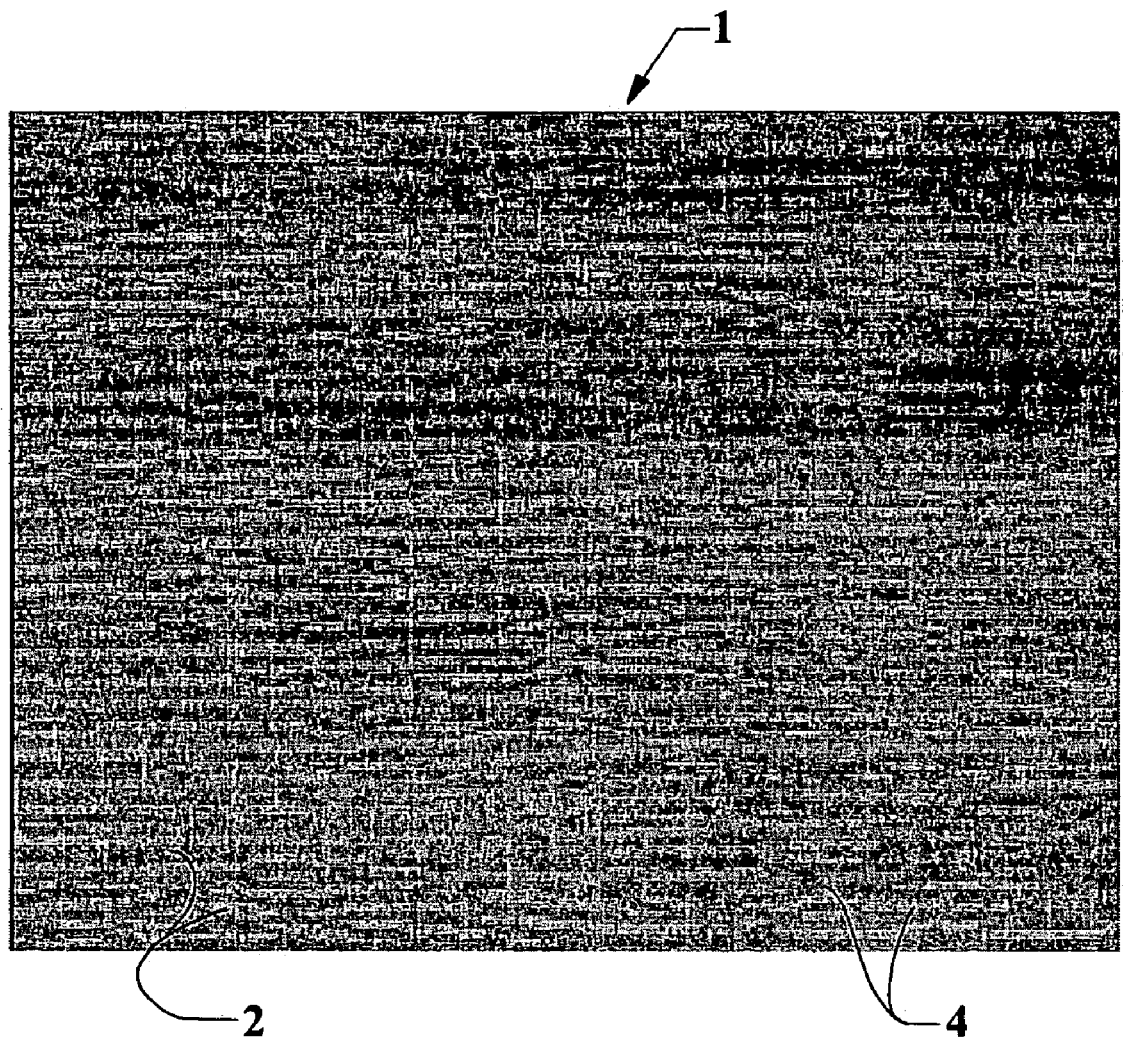
FIG. 1 is a copy of a digital photo of a representative reinforced nonwoven fabric having ridges and grooves of this invention.

This invention relates to a thin reinforced nonwoven fabric for fire blocking an article. When exposed to heat or flame, the fabric is capable increasing to a thickness that is at least 1.5 times its original thickness. The fabric comprises an open mesh scrim having a first side and a second side, the first and second sides having crimped, heat-resistant organic fibers compressed thereon and held in a compressed state by a thermoplastic binder. The nonwoven fabric further has ridges and grooves. Preferably, the ridges and grooves are imparted by dry-creping, meaning the material has been creped without being adhesively adhered to a surface. Preferably, when the fabric is installed on a foam mattress as fire blocking, the fabric is put under tension, which straightens out a substantial number of the ridges and grooves. When the fabric is subjected to high heat or flame, the binder in the structure softens, releasing the restrained crimped fibers and any ridges and grooves, and allowing the thickness of the fabric to increase dramatically. This increase creates pockets of air in the fabric, which is believed to increase the fabric's thermal performance.

The fabric is capable of increasing its thickness in response to high heat or flame because the crimped heat-resistant organic fibers are compressed but not appreciably entangled in the fabric. Previously developed fiber-scrim sheets have concentrated on ensuring a high level of mechanical entanglement of the fibers with the scrim and or with the other fibers in the sheet. Typically, this mechanical entanglement is done by the imparting energy into lofty webs of fibers and/or the scrim that form the sheet to entangle the fibers and density the sheet. When this is done, the fibers of the sheet are so entangled they are not free to move when subjected to heat and flame.

The fabrics of this invention have only enough entanglement of the fibers to manufacture the sheet; that is, the fibers are only entangled with each other to the extent needed to form a lightweight web that can be overlaid or combined with the open mesh scrim. No additional energy is imparted to the sheet to either entangle the fibers with each other or with the scrim. The lightweight web is then laminated to the scrim by heating and compressing the combination and then cooling the combination to set the structure while the crimped fibers are compressed and restrained. By compressing a lofty sheet in this manner, when the binder material is softened, the fibers in the sheet are free to return to a formally lofty state similar to the one they had prior to compression.

The thickness of the reinforced fabric having ridges and grooves of this invention increases to a thickness that is at least 1.5 times its original thickness when exposed to high heat or flame. When the untensioned fabric having ridges and grooves experiences high heat or flame, at least two actions are believed to occur in the fabric. These two actions are best understood by considering separately the first action during high heat or flame, which is attributable to the base compressed sheet used to make the final reinforced fabric, and the second action during high heat or flame that is attributable to ridges and grooves in the final reinforced fabric. The first action is the bulking of the base compressed sheet, which increases the thickness of the compressed sheet and therefore the final reinforced fabric. The second action is the relaxation or unfolding of the ridges and grooves in the final reinforced fabric, which tends to reduce the thickness. The first action or bulking effect is greater than the second action or unfolding effect, therefore providing a reinforced fabric having ridges and grooves that when subjected to high heat or flame is capable of increasing to a thickness that is at least 1.5 times its original thickness, and preferably to a thickness that is twice its original thickness.

The base compressed sheet preferably has an overall thickness of 0.025 to 0.24 centimeters (0.010 to 0.10 inches). Such fabrics also preferably have a basis weight in the range of 20 to 170 g/m$^2$ (0.6 to 5 oz/yd$^2$), with the scrim component preferably making up 3.4 to 34 g/m$^2$ (0.1 to 1.0 oz/yd$^2$) and the fibrous web component preferably ranging from 17 to 136 g/m$^2$ (0.5 to 4.0 oz/yd$^2$). If this base compressed sheet experiences high heat or flame prior to being creped, as the temperature is increased the rate of bulking and the amount of bulking increases, and thickness increases of greater than 25 times the compressed thickness are possible. It is believed that temperatures as low as 150 centigrade are needed to initiate the bulking effect, and it is believed that starting at temperatures of about 225 centigrade the bulking action proceeds immediately. The maximum amount of bulking is achieved when the uncreped, compressed sheet is subjected directly to flame, where the sheet has been seen to bulk approximately 29 times its original thickness. When this base compressed sheet without ridges or grooves is directly exposed to flame, the fabric thickness preferably increases at least 5 times, and preferably 10 times its original thickness.

The reinforced nonwoven fabrics of this invention having ridges and grooves preferably have a basis weight of from about 24 to 170 g/m$^2$ (0.7 to 5.0 oz/yd$^2$). Such creped fabrics also preferably have an overall thickness of about 0.06 to 0.3 centimeters (0.15 to 0.76 inches). The thickness of the untensioned reinforced fabric having ridges and grooves of this invention is capable of increasing to a thickness that is at least 1.5 times its original thickness when exposed to high heat or flame. Preferably, the fabric is capable of doubling in thickness when exposed to high heat or flame. For one illustrative example of the action of the fabric having ridges and grooves of this invention, an untensioned sample of the fabric having an original thickness of 1.9 mm increases to approximately 1.3 times the thickness of the original fabric when exposed to heat of 150 degrees centigrade; when exposed to heat of 200 degrees centigrade, the thickness increases to approximately 1.5 times the thickness of the original fabric; when exposed to heat of 225 degrees centigrade, the thickness increases to approximately 1.8 times the thickness of the original fabric; and when exposed to heat of 250 degrees centigrade, the thickness increases to almost 2.5 times the thickness of the original fabric. As with the base compressed sheet it is believed that a temperature of 150 degrees centigrade are needed to initiate the bulking effect, and it is further believed that starting at temperatures of about 225 centigrade, or when contacted with flame, the bulking action proceeds immediately.

When the reinforced fabric is extended on a mattress, that is, when the fabric is put under tension, it is believed areas of the fabrics flatten to approximately between 10 and 25 percent of their original thickness due to unfolding of the random pleats. Therefore, it is believed the bulking effect, based on the thickness of the tensioned reinforced fabric is generally increased more than two times when the reinforced fabric is actually used on a foam mattress.

The reinforced nonwoven fabric of this invention having ridges and grooves comprises crimped heat-resistant organic fibers. Such crimped fibers are preferably staple fibers that have cut lengths in the range of 0.4 to 2.5 inches (1 to 6.3 cm) preferably 0.75 to 2 inches (1.9 to 5.1 cm) and preferably have 2 to 5 crimps per centimeter (5 to 12 crimps per inch). By "heat resistant fiber" it is meant that the fiber preferably retains 90 percent of its fiber weight when heated in air to 500° C. at a rate of 20 degrees C. per minute. Such fiber is normally flame resistant, meaning the fiber or a fabric made from the fiber has a Limiting Oxygen Index (LOI) such that the fiber or fabric will not support a flame in air, the preferred LOI range being about 26 and higher. The preferred fibers do not excessively shrink when exposed to a flame, that is, the length of the fiber will not significantly shorten when exposed to flame. Fabrics containing an organic fiber that retains 90 percent of its fiber weight when heated in air to 500° C. at a rate of 20 degrees C. per minute tend to have limited amount of cracks and openings when burned by an impinging flame, which is important to the fabric's performance as a fire blocker.

Heat resistant and stable fibers useful in the reinforced nonwoven fire-blocking fabric of this invention include fiber made from para-aramid, polybenzazole, polybenzimidazole, or polyimide polymer. The preferred heat resistant fiber is made from aramid polymer, especially para-aramid polymer.

As used herein, "aramid" is meant a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In the practice of this invention, the preferred para-aramid is poly(paraphenylene terephthalamide). Methods for making para-aramid fibers useful in this invention are generally disclosed in, for example, U.S. Pat. Nos. 3,869,430; 3,869,429 and 3,767,756. Such aromatic polyamide organic fibers and various forms of these fibers are available from DuPont Company, Wilmington, Del. under the trademark Kevlar® fibers.

Commercially available polybenzazole fibers useful in this invention include Zylon® PBO-AS (Poly(p-phenylene-2,6-benzobisoxazole) fiber, Zylon® PBO-HM (Poly(p-phenylene-2,6-benzobisoxazole)) fiber, available from Toyobo, Japan. Commercially available polybenzimidazole fibers useful in this invention include PBI® fiber available from Celanese Acetate LLC. Commercially available polyimide fibers useful in this invention include P-84® fiber available from LaPlace Chemical.

Alternatively, "heat resistant fiber" can include a cellulose fiber that retains at least 10 percent of its fiber weight when heated in air to 700° C. at a rate of 20 degrees C. per minute. These fibers are said to be char forming. Regenerated cellulose fibers having 10 percent inorganic compounds incorporated into the fibers are the preferred cellulose fibers. Such fibers, and methods for making such fibers, are generally disclosed in U.S. Pat. No. 3,565,749 and British Patent No.1,064,271. A preferred char-forming regenerated cellulose fiber for this invention is a viscose fiber containing hydrated silicon dioxide in the form of a polysilicic acid with aluminum silicate sites. Such fibers, and methods for making such fibers, are generally disclosed in U.S. Pat. No. 5,417,752 and PCT Pat. Appl. WO9217629. Viscose fiber containing silicic acid and having approximately 31 (+/–3) percent inorganic material is sold under the trademark Visil® by Sateri Oy Company of Finland.

The heat resistant fibers can be blended with other fibers, however it is preferred the other fibers not compromise the fabric's ability to function as a flame blocker. For example, up to 50 percent modacrylic fibers can be blended with the heat resistant fiber. Modacrylic fiber is useful because this fiber releases flame-suppressing halogen-containing gases when burned. By modacrylic fiber it is meant acrylic synthetic fiber made from a polymer comprising acrylonitrile. Preferably the polymer is a copolymer comprising 30 to 70 weight percent of an acrylonitrile and 70 to 30 weight percent of a halogen-containing vinyl monomer. The halogen-containing vinyl monomer is at least one monomer selected, for example, from vinyl chloride, vinylidene chloride, vinyl bromide, vinylidene bromide, etc. Examples of copolymerizable vinyl monomers are acrylic acid, methacrylic acid, salts or esters of such acids, acrylamide, methylacrylamide, vinyl acetate, etc.

The preferred modacrylic fibers used in this invention are copolymers of acrylonitrile combined with vinylidene chloride, and the copolymer may have in addition an antimony oxide or antimony oxides for improved fire retardancy. Such useful modacrylic fibers include, but are not limited to, fibers disclosed in U.S. Pat. No. 3,193,602 having 2 weight percent antimony trioxide, fibers disclosed in U.S. Pat. No. 3, 748,302 made with various antimony oxides that are present in an amount of at least 2 weight percent and preferably not greater than 8 weight percent, and fibers disclosed in U.S. Pat. Nos. 5,208,105 & 5,506,042 having 8 to 40 weight percent of an antimony compound. The preferred modacrylic fibers are commercially available from Kaneka Corporation, Japan, such as their Protex C fiber which is said to contain 10 to 15 weight antimony oxides; or other fibers having less antimony oxide, in the range of 6 weight percent or less; or fibers having no antimony oxide can also be used.

The crimped organic fibers are preferably held in place with up to 30 parts by weight binder material. The preferred binder material is a combination of binder fiber and binder powder that is activated by the application of heat. Binder fibers are typically made from a thermoplastic material that has a softening point lower than the softening point of any of the other staple fibers in the fiber blend. Sheath/core bicomponent fibers are preferred as binder fibers, especially bicomponent binder fibers having a core of polyester homopolymer and a sheath of copolyester that is a binder material, such as are commonly available from Unitika Co., Japan (e.g., sold under the trademark MELTY®). Useful types of binder fibers can also include those made from polyamide, such as Griltex PA Biko BA 140 8 dpf, 2-inch cut-length nylon binder fibers; or binder fibers made from polypropylene, polyethylene, or polyester polymers or copolymers, the fibers containing only that polymer or copolymer, or as a bicomponent fiber in side-by-side or sheath/core configuration. Preferably the binder fibers are present in an amount of up to 20 percent of the reinforced nonwoven fabric. Binder powder is preferably present in an amount of up to 30 percent of the reinforced nonwoven fabric. The preferred binder powder is a thermoplastic binder powder such as copolyester Griltex EMS 6E adhesive powder or Gnlon SMS D1260 Aft62 polyamide (nylon) powder.

The reinforced nonwoven fabric of this invention also contains an open mesh scrim. Such scrims preferably have a basis weight in the range of 3.4 to 34 g/m$^2$ (0.1 to 1.0 oz/yd$^2$) and are referred to as an "open mesh" scrim because these scrims have only about 0.8 to 6 ends per centimeter (2 to 15 ends per inch) in both the warp and fill directions. The most preferred open mesh scrims have a basis weight in the range of 6.8 to 24 g/m$^2$ (0.2 to 0.7 oz/yd$^2$) and have preferably 1 to 4 ends per centimeter (3 to 10 ends per inch), in both the warp and fill direction. Generally, the mesh scrim is made by binding together two sets of cross-plied polyester continuous filaments or continuous filament yarns that have a binder coating. In some scrims, the ends in any one direction, say the fill direction, can consist of a plurality of continuous filaments that are disposed as desired on either side or both sides of the transversing warp ends. Representative open mesh scrims are available from Saint-Gobain Technical Fabrics of Niagara Falls, N.Y. under the name of Bayex® Scrim Fabrics. Two styles of the Bayex® open mesh scrims are especially useful in the reinforced nonwoven fabrics of this invention. Bayex® Product Number KPM4410/P3 is made from 78 dtex (70 denier) continuous polyester filaments in both the warp and fill directions and has 1.6 ends per cm (4 ends per inch) in both directions. It has a basis weight of 6.8 g/m$^2$ (0.2 oz/yd$^2$) and the continuous filament has a thermoplastic coating that holds the cross-plied filaments in place. Also, Bayex® Product Number PQRS4351/R17 is made from 167 dtex (150 denier) continuous polyester filaments in the warp and 277 dtex (250 denier) continuous polyester filament yarns, in the fill direction, each yarn (or end) having three filaments and having a spacing of 1.6 ends per cm (4 ends per inch) in the warp direction and 1.2 ends per cm (3 ends per inch) in the fill direction. Each individual filament in the yarns has a filament linear density of 2 denier (2.2 dtex). It has a basis weight of 23.7 g/m$^2$ (0.7 oz/yd$^2$) and the continuous filament has a thermoplastic coating that holds the cross-plied filaments in place. This type of scrim provides adequate strength while not excessively contributing to flammability. It is also believed the open mesh also contributes to the formation of open pockets of air in the fabric when the fabric is exposed to high heat because a mesh scrim should restrain less of the heat resistant fibers due to the small number of binding points with the fibrous webs. The scrim can be comprised of thermoplastic or non-thermoplastic filaments, and can be aramid, nylon, glass, or polyester. If the scrim is a thermoplastic such as polyester, when the nonwoven fabric is burned, this mesh essentially disappears in the burned area as the crimped heat resistant fibers are bulking.

The fabric of this invention have coarse ridge and groove formations, meaning that these ridges and grooves are not microscopic but are sensibly prominent, in general comprising about 5 to 25 ridges per lineal inch. The ridges and grooves can be regularly or randomly formed, however, randomly formed ridges and grooves are preferred. By randomly formed it is meant that when the pattern of ridges and grooves are viewed, the ridges and grooves in the fabric are not precisely identical, one to the next. Generally these ridges and grooves are not identical because of such things as local variation in the thickness of the fabric or the fiber orientation in the fabric; when the ridges or grooves are formed due to the columnar collapse of successive segments of the fabric each increment collapses somewhat differently causing differences in the actual ridges and grooves. The result is a fabric that preferably does not nest with another layer of the fabric because the ridges and grooves do not line up.

Figure 2:
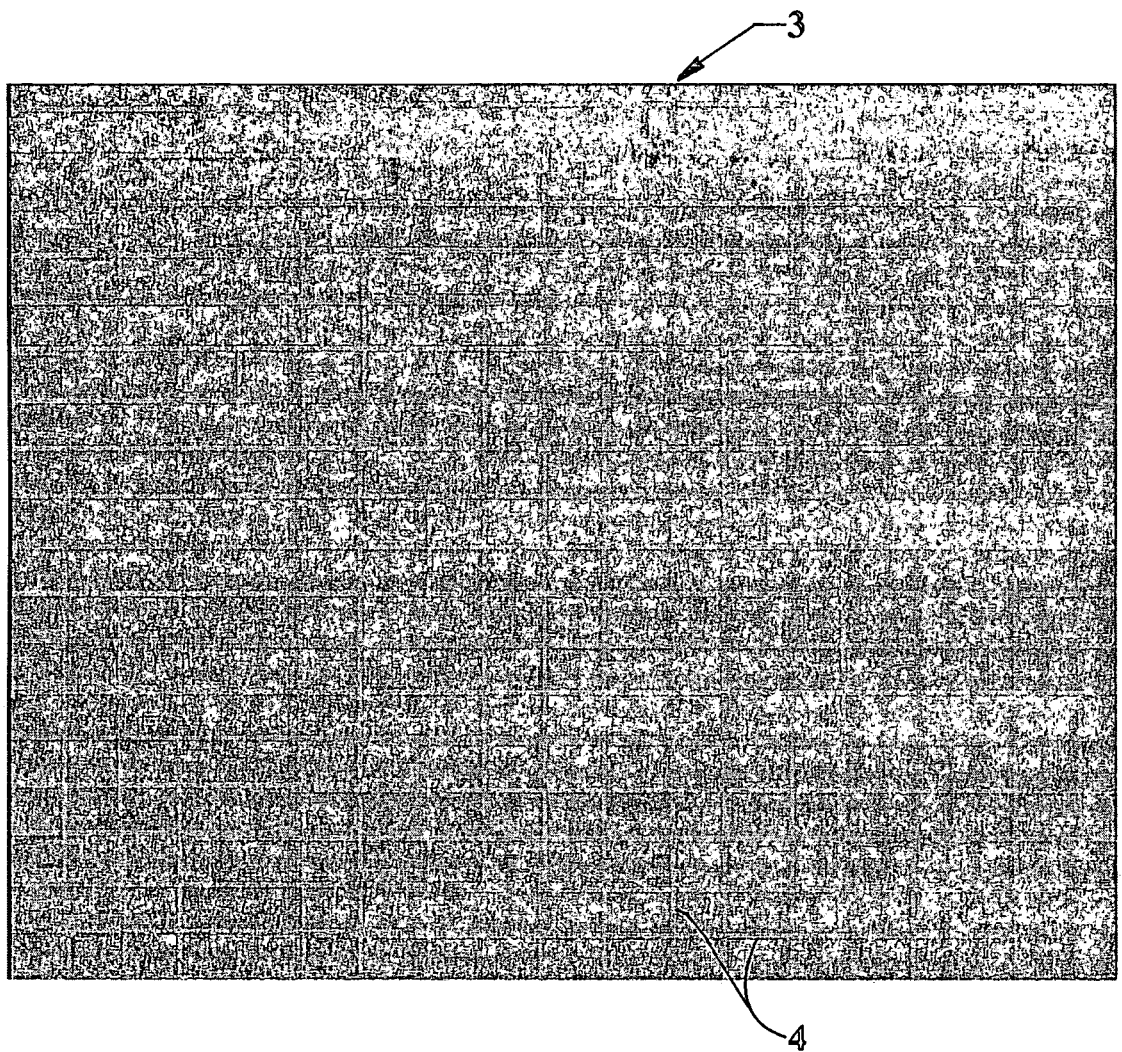
FIG. 2 is a copy of a digital photo of a representative base compressed sheet that is used to make the reinforced nonwoven fabric of this invention.

FIG. 1 is a copy of a digital photo showing the reinforced nonwoven fabric of this invention 1 having random ridges and grooves 2. The base compressed sheet 3 without ridges and grooves is shown in FIG. 2. A reinforcing scrim 4 is shown throughout both the compressed sheet and the fabric of this invention.

The compressed reinforced nonwoven fabric that is creped can be made, for example, using a process that comprises the steps of:
 a) forming first and second webs comprising crimped heat-resistant organic fiber and binder fiber,
 b) contacting the webs with the an open mesh scrim, said scrim having a first side that contacts the first web and the scrim having a second side that contacts the second web, to form a fabric assembly,
 c) applying binder powder to the fabric assembly,
 d) heating the fabric assembly to activate the binder fiber and binder powder,
 f) compressing the fabric assembly to a compressed state,
 g) cooling the fabric assembly in a compressed state to form a reinforced nonwoven fabric, and
 h) imparting ridges and grooves in the compressed fabric The web may be formed by any method that can create low-density webs. For example, clumps of crimped staple fibers and binder fibers obtained from bales of fiber can opened by a device such as a picker. Preferably these fibers are staple fibers having a linear density of about 0.55 to about 110 dtex per filament (0.5 to 100 denier per filament), preferably 0.88 to 56 dtex/filament (0.8 to 50 denier/filament) with the linear density range of about 1 to 33 dtex/filament (0.9 to 30 denier/filament) being most preferred.

The opened fiber mixture can be then blended by any available method, such as air conveying, to form a more uniform mixture. Alternatively, the fibers can be blended to form a uniform mixture prior to fiber opening in the picker. The blend of fibers can then be converted into a fibrous web by use of a device such as a card, although other methods, such as air-laying of the fibers may be used. It is preferable that the fibrous web be used directly as a web from the card without any crosslapping. However, if desired the fibrous web can then be sent via conveyor to a device such as a crosslapper to create a crosslapped structure by layering individual webs on top of one another in a zigzag structure to form a web.

Fibrous webs from one or more cards and an open mesh scrim can then be collected on a transporting belt. Preferably the scrim is inserted between two webs to make a two-web structure. Additional webs can be laid on either of the two webs if needed. Binder powder is then applied to the combined webs and scrim in a preferred amount of about 3.4 to 24 g/m$^2$ (0.1 to 0.7 oz/yd$^2$). The combined webs, binder powder, and scrim are then conveyed through an oven at a temperature sufficient to soften and activate the binder fiber and powder and allow it to adhere the fibers together. At the oven exit the sheet is preferably compressed between two steel rolls to consolidate the layers into a cohesive fabric. The fabric is then preferably cooled in this compressed state.

Ridges and grooves are imparted into the compressed fabric by any available means, but creping methods that impart a series of random ridges and grooves are preferred, and micro-creping or dry-creping methods and equipment such as disclosed in International Patent Application WO2002/076723 to Walton et al.; U.S. Pat. No. 3,260,778 to Walton; U.S. Pat. No. 2,624,245 to Cluett; U.S. Pat. No. 3,426,405 to Walton; and U.S. Pat. No. 4,090,385 to Packard are preferred. Equipment for micro-creping fabrics can be obtained from Micrex Corporation of Walpole, Mass. 02081. Such equipment, in general, presses the fabric to be creped against a driven roll that advances the web towards a retarding element such as a retarding blade, the tip of which is held adjacent the driven roll. The retarding element causes the web to be coarsely folded upon itself by repeated columnar collapse of the sheet to form the preferred ridges and grooves. Heat may be applied to the collapsed sheet to further soften or activate the binder fibers and/or binder powder where they contact the heat resistant fibers. This can help provide some stabilization of the ridges and grooves; however, because of the predominance of heat resistant fibers in the fabric when tension is applied to the sheet perpendicular to the ridges and grooves in the plane of the fabric, some of the ridges and grooves are able to flatten out. The base compressed sheet is mechanically linearly compacted during the microcreping process about 4 to 30 percent, preferably 8 to 25 percent, based on the weight increase of the sheet per unit area.

The fabric of this invention may then be incorporated into an article such as a piece of furniture, or preferably, a mattress and foundation set. One method of fire blocking the mattress is by fully covering the panels and borders of the mattress core with the fabric of this invention, and sewing the fabric together at the seams to encapsulate the mattress. This insures the mattress will be fire blocked regardless of which panel or border is exposed to the flame. However, in a preferred process, the fabric of this invention is first sewn into a sleeve or pocket structure and this structure then slid over a foam mattress that has been compressed. Once the mattress is positioned inside the sleeve, the compression is removed from the foam mattress and the openings in the fabric structure are then sewn, and if desired the foam mattress can be completely surrounded with the material. Preferably the dimensions of the fabric structure are specified such that when the compression on the foam mattress is released, the foam mattress expands and exerts a tension onto the fabric, at least partially stretching out and flattening a number of the ridges and grooves. Foundations, such as box springs, do not normally have to be completely fire blocked but generally are only required to have fire blocking on the borders with fire blocking being optional for the top face or panel of the foundation. However, the reinforced nonwoven fabric of this invention can be used in either the foundation border or panel as desired.

The reinforced nonwoven fabric is believed to provide adequate fire blocking to an article unable to pass California Technical Bulletin 603 issued July 2003, to enable that article to pass California Technical Bulletin 603 issued July 2003 without addition of a chemical flame retardant material. The reinforced nonwoven fabric can be incorporated into the article, such as a mattress, in any manner that allows that mattress to past the test when it would otherwise not pass.

Test Methods

ThermoGravametric Analysis. The fibers used in this invention retain a portion of their fiber weight when heated to high temperature at a specific heating rate. This fiber weight was measured using a Model 2950 Thermogravametric Analyzer (TGA) available from TA Instruments (a division of Waters Corporation) of Newark, Del. The TGA gives a scan of sample weight loss versus increasing temperature. Using the TA Universal Analysis program, percent weight loss can be measured at any recorded temperature. The program profile consists of equilibrating the sample at 50 degrees C.; ramping the temperature at from 10 or 20 degrees C. per minute from 50 to 1000 degrees C.; using air as the gas, supplied at 10 ml/minute; and using a 500 microliter ceramic cup (PN 952018.910) sample container.

The testing procedure is as follows. The TGA was programmed using the TGA screen on the TA Systems 2900 Controller. The sample ID was entered and the planned temperature ramp program of 20 degrees per minute selected. The empty sample cup was tared using the tare function of the instrument. The fiber sample was cut into approximately 1/16" (0.16 cm) lengths and the sample pan was loosely filled with the sample. The sample weight should be in the range of 10 to 50 mg. The TGA has a balance therefore the exact weight does not have to be determined beforehand. None of the sample should be outside the pan. The filled sample pan was loaded onto the balance wire making sure the thermocouple is close to the top edge of the pan but not touching it. The furnace is raised over the pan and the TGA is started. Once the program is complete, the TGA will automatically lower the furnace, remove the sample pan, and go into a cool down mode. The TA Systems 2900 Universal Analysis program is then used to analyze and produce the TGA scan for percent weight loss over the range of temperatures.

Thickness. In Examples 1 and 2, the thickness measurement of both the base compressed sheet and the reinforced nonwoven fabric having ridges and grooves were measured using ASTM D1777-96 Option 1. The thickness measurement was measured using ASTM D5736-95 in Example 3.

Elongation. In the examples, elongation under load was measured using a modification to the ASTM D5034 procedure that stopped the strain at a fixed load of 2 lbs/in. The sample was then held at that elongation for 15 min, after which the load was reduced to zero and the permanent set was measured. This is described in the examples as ASTM D5034 (mod).

For the examples in reference to the fabric composition, all parts and percentages are by weight unless otherwise indicated.

EXAMPLE 1

A reinforced nonwoven fabric was prepared as follows. 80 parts by weight 2.2 dpf, 2" cut length Type 970 Kevlar ® brand staple fiber and 20 parts 4 dpf, 2" cut length Type 4080 Unitika binder fiber were blended as fed from bales to two cards. Fiber webs from the two cards were collected on a transporting belt to create a fiber web having a basis weight of approximately 132 grams per square meter. An open mesh scrim of polyester filament yarn was inserted between the two webs formed by the first two cards. The open mesh scrim was a Bayex® PQRS4351/R17 scrim. The resulting structure had one carded web on one side of the open mesh scrim and one carded web on the other side of the scrim.

EMS Griltex 6E P82/029 polyester -type adhesive powder was applied to the combined webs and scrim in an amount that brought the total sheet weight to approximately 132 grams per square meter. The combined webs, binder powder, and scrim were conveyed through an oven at 140° C. (285° F.) to activate the binder fiber and powder. At the oven exit the sheet was compressed between two steel rolls with 0" gap, which consolidated the components into a cohesive fabric. The fabric then cooled in this compressed state.

The final composition of the fabric was approximately 58% Kevlar® fiber, 15% binder fiber, 20% polyester scrim and 7% binder powder. The compressed fabric had a weight of 132 grams per square meter. The fabric had a thickness of approximately 22 mils per ASTM D1777-96 Option 1. The fabric had an elongation under load (ASTM D5034 (mod.)) of 0.5 percent at a weighting of 2 pounds per inch of width. The permanent set after 15 minutes (ASTM D5034 (mod )) was 0.1 percent.

The fabric was then micro-crimped or micro-creped using A Micrex® Microcreper) available from Micrex Corporation of Walpole Mass., operating at a compaction rate of approximately 25%, which in turn provided a sheet having approximately 8.5 ridges per lineal inch. The fabric increased in weight approximately 18 percent to 156 grams per square meter and thickness increased approximately 150 percent to 57 mils. This fabric had an elongation under load of 21.8 percent at a weighting of 2 pounds per inch of width. The permanent set after 15 minutes of this fabric was 16.6 percent.

Permanent set is the percent increase in the length of the sample as measured 15 minutes after the weight has been removed. The compaction rate is the percent reduction in length, in the machine direction of the sheet, due to the micro-creping of the sheet.

EXAMPLE 2

A reinforced nonwoven fabric was prepared as in Example 1 except the polyester binder fibers were replaced with an essentially equal amount of Griltex PA Biko BA 140 8 dpf, 2-inch cut-length nylon binder fibers.

The final composition of the fabric was approximately 59% Kevlar® fiber, 15% binder fiber, 19% polyester scrim and 7% binder powder. The compressed fabric had a weight of 124 grams per square meter and the fabric had a thickness of approximately 23 mils per ASTM D1777-96 Option 1. The fabric had an elongation under load (ASTM D5034 (mod)) of 0.6 percent at a weighting of 2 pounds per inch. The permanent set after 15 minutes (ASTM D5034 (mod)) was 0.1 percent.

The fabric was then micro-crimped or micro-creped as before, but by using a compaction rate of approximately 15%, which in turn provided a sheet having approximately 12.4 ridges per lineal inch. While the fabric had more ridges per linear inch, the amplitude of the ridges and grooves was lower. The fabric increased in weight approximately 9 percent to 135 grams per square meter and thickness increased approximately 78 percent to 41 mils. This fabric had an elongation under load of 14.95 percent at a loading of 2 pounds per inch of width. The permanent set after 15 minutes of this fabric was 6.7 percent.

EXAMPLE 3

This example illustrates the bulking behavior of the reinforced fabric of this invention. A reinforced nonwoven fabric was prepared similar to Example 1. This fabric had an initial thickness 0.074 in (1.9 mm). Samples of the fabric were placed in a heated oven operating at different temperatures and the time noted when initial bulking of the sample was visually detected. Visual monitoring of the samples continued and the time to essentially full bulking of the samples varied with temperature, with essential full bulking occurring at about five minutes for the sample tested at 150° C. to about 1.5 minutes for the sample tested at 250° C. The samples remained in the oven for a total of 15 minutes and the final bulking thickness recorded. The final bulked thicknesses of the samples were measured by using a Measure-Matic gauge at 0 load (ASTM D5736-95) and are shown in the Table.

TABLE

| Sample # | Temp (° C.) | Duration (min) | Initial Bulking Time (sec) | Thickness (mils(mm)) |
|---|---|---|---|---|
| A | Control | — | — | 74 (1.9) |
| 1 | 150 | 15 | 15 | 96 (2.4) |
| 2 | 200 | 15 | 15 | 112 (2.8) |
| 3 | 225 | 15 | 15 | 133 (3.4) |
| 4 | 250 | 15 | 15 | 181 (4.6) |

What is claimed is:

1. A reinforced nonwoven fabric for fire blocking an article, comprising an open mesh scrim having a first side and a second side, the first and second sides having crimped, heat-resistant organic fibers compressed thereon, the fibers held in a compressed state by a thermoplastic binder, the fabric further having ridges and grooves, wherein when the fabric is exposed to heat or flame, the fabric is capable of increasing to a thickness that is at least 1.5 times its original thickness.

2. The reinforced nonwoven fabric of claim 1 wherein the fabric is capable of doubling its thickness when the fabric is exposed to heat or flame.

3. The reinforced nonwoven fabric of claim 1 wherein the fibers are held in a compressed state by the combination of thermoplastic binder and thermoplastic open mesh scrim.

4. The reinforced nonwoven fabric of claim 1 wherein there are about 5 to 25 ridges per lineal inch of web (2 to 9.8 ridges per linear cm).

5. The reinforced nonwoven fabric of claim 1 wherein the open mesh scrim comprises thermoplastic material.

6. The reinforced nonwoven fabric of claim 1, wherein the thermoplastic binder is binder fiber.

7. The reinforced nonwoven fabric of claim 6, wherein the thermoplastic binder comprises a combination of binder fiber and binder powder.

8. The reinforced nonwoven fabric of claim 1, wherein the thermoplastic binder comprises a polyester or nylon polymer or mixtures of the same.

9. The reinforced nonwoven fabric of claim 1, wherein the heat-resistant organic fiber is a para-aramid fiber.

10. The reinforced nonwoven fabric of claim 9, wherein the para-aramid fiber is poly(paraphenylene terephthalamide).

11. A fire blocked article comprising the reinforced nonwoven fabric of claim 9.

12. A fire blocked mattress comprising the reinforced nonwoven fabric of claim 9.

13. Fire blocked upholstered furniture comprising the reinforced nonwoven fabric of claim 9.

14. The reinforced nonwoven fabric of claim 1, wherein the heat-resistant organic fiber is made from a polymer selected from the group consisting of polybenzazole, polybenzimidazole, and polyimide polymer.

15. The reinforced nonwoven fabric of claim 1, wherein the heat-resistant organic fiber is a cellulose fiber that retains at least 10 percent of its fiber weight when heated in air to 700° C. at a rate of 20 degrees C. per minute.

16. The reinforced nonwoven fabric of claim 15, wherein the cellulose fiber is a viscose fiber containing hydrated silicon dioxide in the form of a polysilicic acid with aluminum silicate sites.

17. The reinforced nonwoven fabric of claim 1, wherein the heat-resistant organic fiber is blended with up to 50 weight percent modacrylic fibers.

18. A fire blocked article comprising the reinforced nonwoven fabric of claim 1.

19. A fire blocked mattress comprising the reinforced nonwoven fabric of claim 1.

20. Fire blocked upholstered furniture comprising the reinforced nonwoven fabric of claim 1.

* * * * *